US012668092B2

(12) United States Patent
Seeger et al.

(10) Patent No.: US 12,668,092 B2
(45) Date of Patent: Jun. 30, 2026

(54) METHOD FOR OPERATING A COMPRESSED AIR SYSTEM

(71) Applicant: ZF CV Systems Europe BV, Brussels (BE)

(72) Inventors: Marco Seeger, Langenhagen (DE); Uwe Stabenow, Laatzen (DE)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 19/325,223

(22) Filed: Sep. 10, 2025

(65) Prior Publication Data

US 2026/0008315 A1 Jan. 8, 2026

Related U.S. Application Data

(63) Continuation of application No. PCT/EP2024/053485, filed on Feb. 12, 2024.

(30) Foreign Application Priority Data

Mar. 10, 2023 (DE) ..................... 10 2023 105 974.2

(51) Int. Cl.
*B60G 17/052* (2006.01)

(52) U.S. Cl.
CPC .... *B60G 17/0528* (2013.01); *B60G 2202/152* (2013.01); *B60G 2400/51222* (2013.01);
(Continued)

(58) Field of Classification Search
CPC .......... B60G 17/0528; B60G 2202/152; B60G 2400/51222; B60G 2500/2041;
(Continued)

(56) References Cited

U.S. PATENT DOCUMENTS

| | | | |
|---|---|---|---|
| 2001/0017449 | A1 | 8/2001 | Stiller |
| 2008/0258413 | A1 | 10/2008 | Ilias et al. |

(Continued)

FOREIGN PATENT DOCUMENTS

| | | |
|---|---|---|
| DE | 100 06 024 C1 | 10/2001 |
| DE | 10 2005 044 806 A1 | 3/2007 |

(Continued)

OTHER PUBLICATIONS

International Search Report of the European Patent Office dated May 23, 2024 for international application PCT/EP2024/053485 on which this application is based.

(Continued)

*Primary Examiner* — Jason D Shanske
*Assistant Examiner* — Shams Dhanani
(74) *Attorney, Agent, or Firm* — Walter Ottesen, P.A.

(57) ABSTRACT

A method is for operating a compressed air system in a vehicle. The compressed air system has pneumatically operated actuators, switchable pneumatic valves and devices for supplying and preparing compressed air, which are connected to one another via a pneumatic line system. The devices for supplying compressed air include a compressed air source and a compressed air store, and in the line system a pressure sensor is provided for measuring the pressure. An algorithm is programmed such that depending on the difference between the pressure in the compressed air store and the pressure in the line system, pneumatic valves are actuated to connect the compressed air store to the line system only after pressure equalization between the pressure in the compressed air store and the pressure in the line system. During pressure equalization, compressed air from the source and/or the actuators or devices is introduced into the line system.

25 Claims, 3 Drawing Sheets

(52) U.S. Cl.
CPC ................ *B60G 2500/2041* (2013.01); *B60G 2500/2042* (2013.01); *B60G 2500/205* (2013.01)

(58) Field of Classification Search
CPC ...... B60G 2500/2042; B60G 2500/205; B60G 2400/51; B60G 2500/2014; B60G 17/0523; F15B 1/00
See application file for complete search history.

(56) References Cited

U.S. PATENT DOCUMENTS

| | | | |
|---|---|---|---|
| 2011/0049819 A1 | 3/2011 | Matthies et al. | |
| 2013/0192681 A1 | 8/2013 | Meier | |
| 2013/0320645 A1 | 12/2013 | Gall | |
| 2015/0330059 A1* | 11/2015 | Tanaka | F15B 1/00 60/421 |
| 2017/0341480 A1 | 11/2017 | Oishi et al. | |
| 2018/0222275 A1 | 8/2018 | Reuter et al. | |
| 2019/0093774 A1* | 3/2019 | Ishibashi | F16K 27/003 |
| 2026/0008315 A1* | 1/2026 | Seeger | B60G 17/0523 |
| 2026/0070387 A1* | 3/2026 | Eger | B60G 17/017 |

FOREIGN PATENT DOCUMENTS

| | | |
|---|---|---|
| DE | 10 2008 021 818 A1 | 11/2009 |
| DE | 10 2012 001 734 A1 | 8/2013 |
| DE | 10 2012 010 390 A1 | 12/2013 |
| DE | 10 2017 111 662 A1 | 11/2017 |
| EP | 3 360 708 A2 | 8/2018 |

OTHER PUBLICATIONS

English Translation Written Opinion of the International Searching Authority dated May 23, 2024 for international application PCT/EP2024/053485 on which this application is based.

* cited by examiner

METHOD FOR OPERATING A COMPRESSED AIR SYSTEM

CROSS-REFERENCE TO RELATED APPLICATIONS

This application is a continuation application of international patent application PCT/EP2024/053485, filed Feb. 12, 2024, designating the United States and claiming priority from German application 10 2023 105 974.2, filed Mar. 10, 2023, and the entire content of both applications is incorporated herein by reference.

TECHNICAL FIELD

The disclosure relates to a method for operating a compressed-air system in a vehicle, wherein the compressed-air system has a plurality of pneumatically operated actuators, switchable pneumatic valves and further compressed-air supply devices and compressed-air treatment devices, which are interconnected via a pneumatic line system. The compressed-air supply devices include at least one compressed-air source and a compressed-air accumulator. A pressure sensor is provided in the line system for the purposes of measuring the pressure. At least one electronic control device is provided for the open-loop and closed-loop control of the compressed-air system, and the pneumatic valves, compressed-air supply devices and compressed-air treatment devices are actuated in accordance with an algorithm, which is programmed in the control device, and a switching program, namely a so-called switching logic, which is specified in the algorithm.

The method according to the disclosure is preferably usable for the operation of a compressed-air system in a vehicle air suspension system, wherein a plurality of air spring bellows assigned to the respective wheels or axles of the vehicle are provided as actuators and are each connectable via a switchable bellows valve to the pneumatic line system. The disclosure accordingly also relates to a vehicle air suspension system suitable for carrying out the method, to an algorithm that is programmed in a control device of a vehicle controller, and to a motor vehicle having such an air suspension system.

BACKGROUND

Compressed-air systems, also referred to as compressed-air supply systems, have various compressed-air treatment and compressed-air supply devices and are generally configured as open or closed systems. In the case of open systems, the compressed-air system/pneumatic system is supplied with air originating directly from the atmosphere, the air being introduced via the compressor. Also, in an open system, air from a compressed-air accumulator is used for example to accelerate the filling of the bellows via a compressor.

By contrast, in the case of a closed system, the air used for supplying to the compressed-air system originates primarily from a compressed-air accumulator in a closed circuit. Here, the compressed air is conveyed via a compressor from the compressed-air accumulator into the pneumatic system, in particular for the purposes of filling bellows in an air spring system. Analogously, when the bellows are emptied during a lowering of the vehicle, the compressed air flows back into the compressed-air accumulator with assistance from the compressor.

A compressed-air accumulator is therefore a major element in both systems. Given the high levels of power that are common nowadays, for example in the case of Electronically Controlled Air Suspension (ECAS) systems, considerable amounts of air at high pressure must be handled in the system.

If the compressed-air accumulator is connected suddenly to the rest of the line system, for example in order for the compressed-air accumulator to be filled via the compressor or for the air springs to be filled from the compressed-air accumulator, it is possible, in cases in which there is a considerable pressure difference between the compressed-air accumulator and line system, for intense generation of noise to occur during the abrupt pressure change that then takes place in the system. This generation of noise, so-called "tank hammer", arises because a sudden pressure change and high dynamics/high flow rates give rise to a pressure wave or a pressure shock, which in compressed-air accumulators of relatively large volume is intensified by the accumulator wall acting as a membrane and is transmitted as body-borne and/or airborne sound into the vehicle.

This unpleasant generation of noise during filling operations or venting operations involving the compressed-air accumulator arises in particular in the event of interaction of unfavorable parameters in the configuration of the overall system and/or in the controller.

SUMMARY

It is an object of the disclosure to provide a method for operating a compressed-air system in a vehicle, with the aid of which method such a generation of noise, tank hammer, can be avoided.

The object is achieved via various embodiments of the disclosure.

According to an embodiment, the algorithm for the switching program is programmed such that, depending on the difference between the pressure in the compressed-air accumulator and the pressure in the line system, pneumatic valves are actuated in order to connect the compressed-air accumulator to the line system only after a pressure equalization, initiated by the control device by actuation of switchable pneumatic valves, between the pressure in the compressed-air accumulator and the pressure in the line system has been carried out, wherein, for the pressure equalization, compressed air is introduced from the compressed-air source and/or the actuators into the line system.

Actuators refer to drive modules which convert an electrical signal into mechanical movements or changes in physical variables such as pressure or temperature and thus actively intervene in the controlled process, for example air spring bellows in an air suspension system.

An embodiment of the method is preferably usable for the operation of a compressed-air system in a vehicle air suspension system, wherein a plurality of air spring bellows assigned to the respective wheels or axles of the vehicle are provided as actuators and are each connectable via a switchable bellows valve to the pneumatic line system. The compressed-air supply devices and compressed-air treatment devices include at least one electrically driven compressor, a compressed-air accumulator connectable via at least one switchable accumulator valve to the line system, and also an air dryer and an air filter. The pressure equalization is carried out by virtue of compressed air being introduced from the compressor and/or the air spring bellows into the line system.

In the case of vehicle air suspension systems for heavy goods vehicles, in which high air flow rates and high pressure are required for filling the air spring bellows, the method according to the disclosure achieves a particularly great reduction of undesired noise generation caused by tank hammer.

An embodiment of the method which can be implemented easily with little outlay on circuitry includes that, before the compressed-air accumulator is filled via the compressor, a pressure equalization carried out in the compressor is firstly activated, the pressure in the line system is then measured, and the compressed-air accumulator is connected via the accumulator valve to the line system only if the pressure in the line system has been equalized with the pressure in the compressed-air accumulator as a result of the operation of the compressor.

Depending on the construction and configuration of the compressed-air system, the pressure equalization does not necessarily need to take place to an absolutely identical value, that is, a pressure difference of 0 bar. For the method according to the disclosure, it is essential that a pressure difference $\Delta P_{(2)}$ that still prevails after a pressure equalization is less than a pressure difference $\Delta P_{(1)}$, which prevailed between the pressure in the compressed-air accumulator (accumulator pressure) and pressure in the line system (line pressure) before the pressure equalization, to such an extent that tank hammer is avoided. To avoid unpleasant pressure shocks or tank hammer, an embodiment of the method is also suitable in which a pressure equalization is carried out such that the pressure in the line system differs by at most +/−10% from the pressure in the compressed-air accumulator (accumulator pressure). Even a somewhat higher difference may be possible if it can be determined, for example by tests, that generation of noise caused by pressure shocks/tank hammer does not occur, or occurs only to an acceptable degree.

An embodiment of the method includes that, before the pressure in the compressed-air accumulator is measured via a pressure sensor, a pressure equalization is carried out within the line system by virtue of compressed air being introduced from at least one air spring bellows into the line system, wherein the at least one air spring bellows is firstly connected via the respective bellows valve to the pneumatic line system, and after a pressure in the line system has been approximated to the pressure in the compressed-air accumulator, the bellows valve is closed and the accumulator valve is opened. Such a pressure equalization by introduction of compressed air from the bellows often avoids noisy operation of the compressor (compressor operation, compressor running), but must be weighed up against the possibly noticeable effect of a slight lowering of the vehicle body that is supported by the air springs.

Renewed measurement of the accumulator pressure is performed at regular intervals both for the purposes of leak detection and during active operations/switching operations in the compressed-air system. Before the "renewed" measurement, the most recent known value for the accumulator pressure may be used as an output variable for the accumulator pressure, wherein it is generally assumed that no leakage is present.

A further embodiment of the disclosure includes that, before the air spring bellows are filled from the compressed-air accumulator, the so-called "overflow", the pressure equalization is carried out in that, if there is a pressure difference $\Delta P_{(1)}$ between the pressure in the compressed-air accumulator (accumulator pressure) and the pressure in the line system (line pressure), compressed air is firstly conducted from at least one of the air springs into the line system, and the compressed-air accumulator is connected via switchable valves to the line system only if the pressure difference $\Delta P_{(1)}$ has been equalized or reduced to a value of $\Delta P_{(2)} < \Delta P_{(1)}$. For clarification, it should be noted that $\Delta P_{(1)}$ denotes the pressure difference between accumulator pressure and line pressure before a pressure equalization, whereas $\Delta P_{(2)}$ represents the pressure difference after a pressure equalization between accumulator pressure and line pressure. Here, the equalization or reduction of the pressure difference is dependent on the pressure available in the air spring bellows, such that it is not possible to specify a fixed value for the remaining pressure difference. In this regard, it must be borne in mind that an average pressure of approximately 8 bar can be assumed to be present in the air spring bellows, whereas a pressure of approximately 15 bar may prevail in the pressure accumulator. It is however essential that the increase of pressure in the line system by virtue of pressure medium being discharged from the bellows into the line system is performed such that the previously determined pressure difference between accumulator pressure and line pressure becomes as low as possible in order to avoid tank hammer.

A further embodiment of the method according to the disclosure includes that, before the dryer is regenerated by virtue of compressed air being blown out via a blow-off valve, the pressure equalization is carried out in that, if there is a pressure difference between the pressure in the compressed-air accumulator (accumulator pressure) and the pressure in the line system (line pressure), compressed air is firstly conducted from either at least one of the air springs and/or via the compressor into the line system, and the compressed-air accumulator is connected via switchable valves to the line system, and via the latter to the blow-off valve, only if pressure equalization has been established between the line pressure and the pressure in the compressed-air accumulator. The method according to the disclosure makes it possible to avoid tank hammer or pressure shocks even during a regeneration, that is, during a process of the dryer being blown out with dry system air, such as is necessary at regular intervals for the purposes of absorbing and discharging moisture.

For use in the embodiment of an air suspension system described further below, in which, firstly, the air spring bellows and the switchable bellows valves are directly interconnected in a first pneumatic line system (bellows-related gallery) and, secondly, at least some of the compressed-air supply and treatment devices are provided in a second pneumatic line system (accumulator-related gallery), and in which the bellows-related and accumulator-related galleries are interconnected via at least one separation valve, an embodiment of the method is suitable in which, for the regeneration, the pressure in a first bellows-related line system (bellows-related gallery) is measured and, if there is a pressure difference between accumulator pressure and line pressure, compressed air is conducted from air springs or via the compressor into the line system.

The pressure equalization during the regeneration may then be realized for example via the following sequences of switching operations:

opening the bellows valves and the separation valve until pressure equalization is established in the "bellows-related gallery"—this being determined by measurement (pressure sensor)—then closing the separation valve and only subsequently opening the accumulator valve and the discharge valve, through which the air is discharged into the surroundings. Here, the pressure equalization is performed only via the pressure present in the bellows; the method is thus quiet, but a lowering of the vehicle may occur (regeneration, switching logic/switching sequence A).

A further possible sequence includes: activating the compressor, opening the separation valve until pressure equalization is established in the "bellows-related gallery"—this being determined by measurement or on the basis of the running time of the compressor—then closing the separation valve and only subsequently opening the accumulator valve and the discharge valve, through which the air is discharged into the surroundings; lowering of the vehicle does not occur, but the regeneration process thus implemented is noisier (regeneration, switching logic/switching sequence B).

A further embodiment of the method includes that, if the pressure equalization by introduction of compressed air from an air spring bellows is repeated, compressed air is conducted into the line system from at least one air spring bellows other than that used for a preceding pressure equalization. Since discharging of compressed air from an air spring bellows into the line system can cause the body to be lowered at the wheel or axle that is supported by the bellows, this effect can be avoided or at least minimized by correspondingly alternating the air spring bellows used for the introduction of compressed air.

In a further embodiment of the method, if compressed air is introduced from a plurality of air spring bellows into the line system, compressed air is introduced firstly from that air spring bellows which has the lowest bellows pressure, and compressed air is subsequently introduced sequentially from those air spring bellows which have the next higher bellows pressure in each case. This procedure also firstly has the effect that lowering of one corner of the vehicle, for example, is reduced or avoided, and secondly provides the highest possible equalization pressure in the line system. If the same pressure prevails in two bellows, the two are connected to the line system sequentially either in accordance with a random function or in a manner specified by a previously set sequence, possibly on a vehicle-specific basis.

In another embodiment of the method, instead of or in addition to compressed air from one of the air spring bellows, compressed air is introduced into the line system via the compressor. It is thus possible for the corresponding pneumatic switching operations, or the implementation of pressure steps, to be shortened or simplified.

In the case of air spring bellows being filled from the compressed-air accumulator with assistance by operation of the compressor (compressor-assisted residual pressure recovery from the compressed-air accumulator), so-called "boost" operation, another embodiment of the method is used in which pressure equalization is performed in that, if there is a pressure difference $\Delta P_{(1)}$ between the pressure in the compressed-air accumulator (accumulator pressure) and the pressure in the line system (line pressure), compressed air is firstly introduced from at least one of the air spring bellows and/or via the compressor into the line system, and the air spring bellows and the compressed-air accumulator are connected to the line system, and compressed air conveyed from the accumulator via the line system into the air spring bellows with assistance from the compressor, only if the pressure difference $\Delta P_{(1)}$ has been equalized or reduced to a value of $\Delta P_{(2)} < \Delta P_{(1)}$.

The term "compressor assistance" or the expression/feature "assistance by operation of the compressor" mean that at least one stage of the compressor is utilized to generate an increased flow and/or elevated pressure of the medium (air) within the line system, that is, to energetically "supercharge" pressure medium within the system. In conjunction with the switching states of "boost" and "reflow" as described further below, this means that the compressor is then utilized not to compress "new" air from the atmosphere and pump the air into the system but rather to accelerate/improve the operations within the system. This is not to be confused for example with the preceding pressure equalization, during which the compressor, as discussed above, may indeed introduce compressed air into the line system.

Compressor assistance during or for the purposes of the pressure equalization is in principle noisier than pressure equalization from the air spring bellows, but reduces the risk that the body may be lowered at the wheel or axle that is supported by the bellows.

An embodiment of the method in the case of "boost" operation includes that, after the pressure equalization, a connection is established between air spring bellows and compressed-air accumulator by virtue of a separate boost valve and the bellows valves being opened. Such an embodiment of the method or of the switching sequence is suitable in particular in the case of the embodiment of an air suspension system described further below, in which, firstly, the air spring bellows and the switchable bellows valves are directly interconnected in a first pneumatic line system (bellows-related gallery) and, secondly, the compressed-air supply and treatment devices are provided and interconnected in a second pneumatic line system (accumulator-related gallery). Here, the bellows-related gallery and the accumulator-related gallery are interconnected via a separation valve and a further "reflow valve" connected to the boost line, wherein the pressure sensor is arranged in the bellows-related gallery.

In the air suspension system described by way of example below, the pressure accumulator is connectable not only via the accumulator valve but also via a separate "boost valve" to the line system. In the case of air spring bellows being filled via compressor-assisted residual pressure recovery from the compressed-air accumulator, the pressure equalization may then be implemented for example via the following sequences of switching operations/switching sequences:

activating the compressor, opening the separation valve and the reflow valve until pressure equalization is established in the "boost line"—this being determined by measurement or on the basis of the running time of the compressor—then opening the "boost valve" provided for the connection to the accumulator and opening the bellows valves, with a reflow valve that is likewise provided in the described air suspension system being closed beforehand or at the latest at the same time (boost, switching logic/switching sequence A).

A further possible sequence includes: activating the compressor, opening the separation valve until pressure equalization is established in the "bellows-related gallery"—this being determined by measurement or on the basis of the running time of the compressor—then opening the "boost valve" provided for the connection to the accumulator, and simultaneously or subsequently opening the bellows valves (boost, switching logic/switching sequence B).

Another possible sequence includes: opening the bellows valves and the reflow valve until pressure equalization is established in the "boost line"—this being determined by measurement. Here, the pressure equalization is carried out not via the compressor but only via the pressure that is present in the bellows (quiet, but lowering of the vehicle is possible) (boost, switching logic/switching sequence C).

Further variants of switching sequences in the case of the compressor-assisted residual pressure recovery from the compressed-air accumulator are possible, for example the opening of the bellows valves and of the separation valve until pressure equalization is established in the "bellows-related gallery", following which the bellows valves are closed again and the accumulator valve is opened (boost, optional switching logic/switching sequence).

From the switching sequence/switching logic described here, it is once again clear that, before the accumulator is connected to the line system, in this case during switching of the air suspension system into the boost mode, the disclosure provides a sequence of switching operations for valves and apparatuses/devices which leads to a preceding pressure equalization between accumulator pressure and pressure in the line system.

The reversed medium guidance in relation to the "boost" mode is the so-called "reflow" mode, namely filling of the compressed-air accumulator from the air spring bellows with assistance by operation of the compressor (compressor-assisted residual pressure recovery from the air spring bellows). In this "reflow" mode, a further embodiment of the method is used in which, before a filling operation, a pressure equalization is carried out in that the pressure in the line system is measured and, if there is a pressure difference $\Delta P_{(1)}$ between the pressure in the compressed-air accumulator (accumulator pressure) and the pressure in the line system (line pressure), compressed air is firstly introduced from at least one of the air springs and/or via the compressor into the line system, and the compressed-air accumulator and the air spring bellows are connected to the line system, and compressed air conveyed from the air spring bellows via the line system into the compressed-air accumulator with assistance from the compressor, only if the pressure difference $\Delta P_{(1)}$ has been equalized or reduced to a value of $\Delta P_{(2)} < \Delta P_{(1)}$.

A further embodiment of the method includes that, after the pressure equalization, a connection is established between air spring bellows and compressed-air accumulator by virtue of the accumulator valve and a separate reflow valve, which connects the compressed-air accumulator to the first bellows-related line system (bellows-related gallery), and the bellows valves being opened.

The two latter embodiments of the method are particularly suitable for use with the embodiment of an air suspension system described further below, having a bellows-related gallery and an accumulator-related gallery separated therefrom by a separation valve. The pressure equalization during "reflow" operation may then be realized for example via the following sequences of switching operations:

activating the compressor, opening the separation valve until pressure equalization is established in the "bellows-related gallery"—this being determined by measurement or on the basis of the running time of the compressor—then closing the separation valve and opening the accumulator valve at the same time as or after opening the bellows valve(s), with the reflow valve being open (reflow, switching logic/switching sequence A).

A further possible sequence includes: opening the bellows valves and the separation valve until pressure equalization is established in the "bellows-related gallery"—this being determined by measurement—then closing the separation valve and opening the reflow valve and the accumulator valve. Here, the pressure equalization is carried out not via the compressor but only via the pressure that is present in the bellows (reflow, switching logic/switching sequence B; quiet, but lowering of the vehicle is possible).

A further embodiment of the method includes that one of the following values is taken as a basis as a line pressure:

either a pressure in the line system (line pressure) measured at a preceding point in time in a first bellows-related line system and/or in a second accumulator-related line system, or a stored old value of the pressure in the line system, or a fixed value for the pressure in the line system, preferably a value of $\leq 2$ bar.

Another embodiment of the method includes that, in the case of a pressure equalization between the pressure in the compressed-air accumulator (accumulator pressure) and pressure in the line system (line pressure) carried out by compressor operation, the line pressure achievable by compressor operation is determined on the basis of tables, stored in the algorithm, for the correlation between compressor running time and line pressure.

A further embodiment of the method includes that the accumulator pressure is specified as a fixed value by the algorithm, preferably as an empirically determined average value. Such a procedure simplifies the switching sequence to the same degree as another embodiment of the method which includes that, in the case of a pressure equalization between the accumulator pressure and the pressure in the line system carried out by compressor operation, the line pressure achievable by compressor operation is attainable on the basis of running times of the compressor stored in the algorithm, and the compressed-air accumulator is connected via switchable valves to the line system only if the running times have been reached. By contrast to the aforementioned determination on the basis of table values, at least feedback of the running times is required here.

The term "gallery" that is often used in the technical jargon for a region of the compressed-air system is not always exactly and unequivocally definable, and is used both for parts of the line system which relate to the compressed-air supply and the accumulator and for line parts which include only the actuators, in this case the air springs. Thus, depending on the configuration and structure of the compressed-air system, not only the "boost line" and parts connected thereto may be made accessible for the pressure equalization, but also other parts in the line system, for example the direct connecting line, referred to as bellows-related gallery, between the individual air spring bellows or between the associated bellows valves. For this purpose, corresponding sequences of valve switching operations are provided in the algorithm.

In the vehicle air suspension systems discussed further below in the embodiments, the line system and the valve arrangement are configured such that the boost line is, at least in parts, identical to the reflow line, thus simplifying the construction of the entire compressed-air system having a two-stage compressor.

The method according to the disclosure for operating a compressed-air system is particularly effective for avoiding tank hammer in interaction with a vehicle air suspension system in which the air spring bellows and the switchable bellows valves are interconnected in a first pneumatic line system (bellows-related gallery), while the compressed-air supply and treatment devices are provided in a second pneumatic line system (accumulator-related gallery), and the first and the second pneumatic line system are interconnectable via at least one switchable pneumatic valve configured as a separation valve. The pressure sensor is arranged in the first pneumatic line system (bellows-related gallery).

Preferably, for the connection between the bellows-related gallery and the accumulator-related gallery, a further valve (reflow valve) is provided which is connected in parallel, and for the connection of the accumulator to the line system, a valve (boost valve) is provided which is connected in parallel with respect to the accumulator valve.

The disclosure also relates to a vehicle air suspension system having a control device in which an algorithm for carrying out a switching program in accordance with the method according to the disclosure is programmed, to an algorithm of the type, and to a vehicle, in particular a utility vehicle, having a vehicle air suspension system of the type.

BRIEF DESCRIPTION OF DRAWINGS

The invention will now be described with reference to the drawings wherein.

DETAILED DESCRIPTION

Expressions that are nowadays preferentially used in the technical jargon have been included where appropriate. In the figures, identical or similar elements may be denoted by the same reference signs. For elucidation of the disclosure, it is advantageous if the figures are viewed together.

Figure 1:
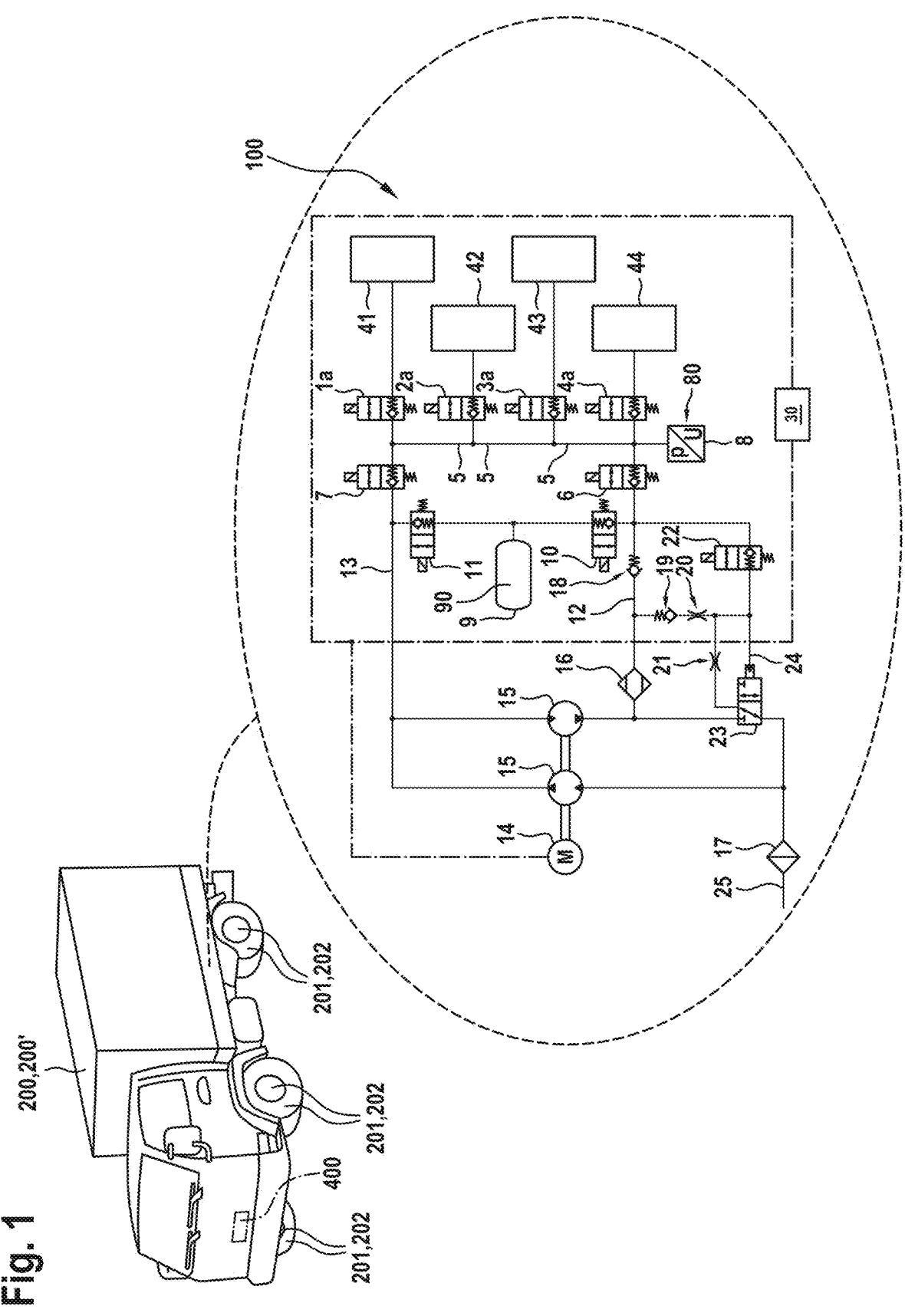
FIG. 1 is a diagrammatic illustration of the assignment of a compressed-air system which operates in accordance with the method according to the disclosure for operation in a vehicle.

FIG. 1 is a diagrammatic illustration of the assignment of a compressed-air system 100 which operates in accordance with the method according to the disclosure for operation in a vehicle 200, specifically in this case for operation in a utility vehicle 200'. The individual devices, apparatuses and functions of the compressed-air system 100 are illustrated using conventional pneumatics symbols and further technical symbols, substantially correspond to the two illustrations in FIGS. 2 and 3, and are described in detail further below.

Figure 2:
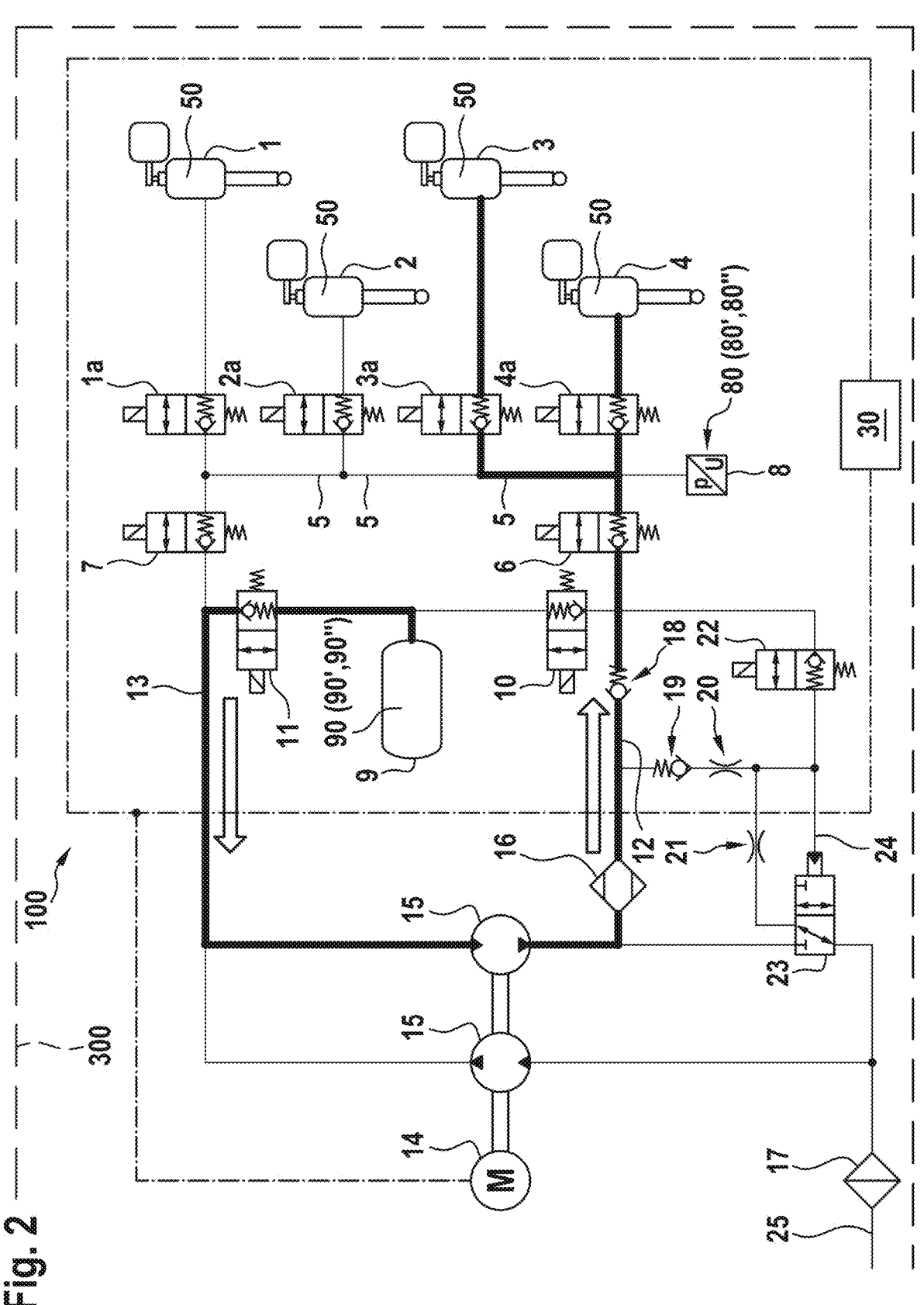
FIG. 2 is the pneumatic circuit diagram of a compressed-air system of a vehicle air suspension system, in this case in the boost mode, namely during the filling of air spring bellows via compressor-assisted residual pressure recovery from the compressed-air accumulator; and, FIG. 3 is the pneumatic circuit diagram of a compressed-air system of a vehicle air suspension system, in this case in the reflow mode, namely during the filling of the compressed-air accumulator via compressor-assisted residual pressure recovery from air spring bellows.
Figure 3:
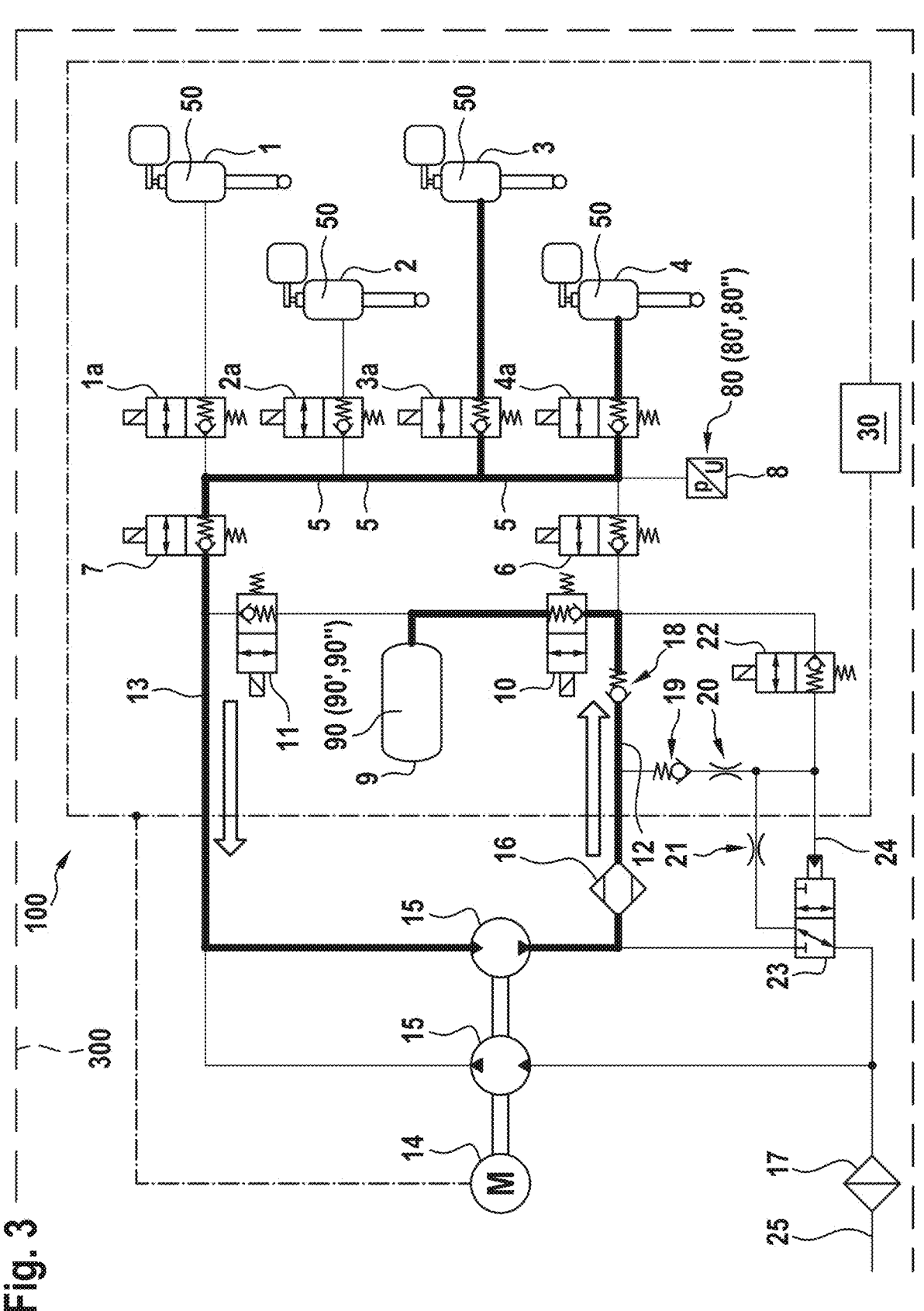

Here, the compressed-air system 100 illustrated in FIG. 1 differs only slightly from the illustrations in FIGS. 2 and 3, namely firstly in that, in FIG. 1, actuators 41-44 are illustrated in general "black box" form, whereas in FIGS. 2 and 3, actuators are illustrated in the form of symbolically indicated air springs with air spring bellows 1-4. Secondly, in FIGS. 2 and 3, some line parts are plotted with a greater thickness for the purposes of elucidating particular switching variants/switching sequences, as will also be discussed in detail further below.

The compressed air system illustrated in FIGS. 2 and 3 is provided for the operation of a vehicle air suspension system 300 in a vehicle 200, 200'. For the sake of simplicity, the vehicle air suspension system 300 is illustrated merely by a dashed line surrounding the compressed-air system.

As can also be seen in FIGS. 2 and 3, a plurality of air spring bellows 1-4 assigned to the respective wheels 201 or axles 202 of the vehicle 200, 200' are provided as actuators in the figures, wherein, in FIGS. 1 to 3, for the purposes of elucidating those features of the operation of the compressed-air system which are essential to the disclosure, well-known structural details of a vehicle air suspension system have been omitted from the illustration.

The compressed-air system illustrated in FIGS. 2 and 3 and provided for the operation of a vehicle air suspension system 300 interacts with a control device 30 in which an algorithm for carrying out a switching program in accordance with the method according to the disclosure is programmed. The control device 30 is in turn incorporated into a vehicle controller 400, illustrated in principle in FIG. 1, wherein the control device 30 and vehicle controller 400 are connected in a known manner via corresponding electrical lines or by wireless communication to the compressed-air system for interaction purposes. For the sake of clarity, the control device 30 and vehicle controller 400 are merely indicated using dash-dotted lines.

FIGS. 2 and 3 each show the pneumatic circuit diagram of a compressed-air system of a vehicle air suspension system, in which, as stated above, the individual devices, apparatuses and functions are illustrated via pneumatics symbols and further technical symbols, and two different switching configurations/switching sequences are illustrated. The advantages of the method according to the disclosure, namely the avoidance of tank hammer, are particularly pronounced in such a compressed-air system.

Here, FIG. 2 shows the switching configuration of the compressed air system in a so-called boost mode, in which the air spring bellows 1 to 4 are filled from the compressed-air accumulator 9, wherein the filling of the air spring bellows 1 to 4 is assisted by operation of the compressor 15, that is, the figure shows the switching configuration in the case of so-called compressor-assisted residual pressure recovery from the compressed-air accumulator 9.

FIG. 3 shows the switching configuration in the reflow mode, a switching configuration which exhibits reversed medium guidance with respect to the compressed-air accumulator in relation to the "boost" mode and in which the compressed-air accumulator 9 is filled from the air spring bellows 1 to 4, wherein, here, the filling of the compressed-air accumulator 9 is assisted by operation of the compressor 15, that is, the figure shows the switching configuration in the case of so-called compressor-assisted residual pressure recovery from the air spring bellows 1 to 4.

For elucidation, the flow-carrying lines/line parts that define the boost mode and the reflow mode respectively are plotted with a greater thickness in FIGS. 2 and 3.

Starting at the right-hand side of the pneumatic circuit diagram that is taken as a basis for consideration in each of FIGS. 2 and 3, it is possible to see, as actuators, the air spring bellows 1 to 4, in which a pressure 50 prevails and which can be connected via respectively associated bellows valves 1a to 4a to a so-called bellows-related gallery 5. The bellows-related gallery 5 is that part of the line system which produces a direct, closest connection between the air spring bellows and bellows valves.

The bellows-related gallery 5 is connected via two further valves to the rest of the line system, namely firstly via a separation valve 6 and secondly via the so-called reflow valve 7. Likewise, a pressure sensor 8 is provided at or in the bellows-related gallery 5, the pressure sensor in this case being arranged between the bellows valves 1a to 4a and the valves 6 and 7 and, during a pressure measurement, outputting to the control device 30 an electrical signal that corresponds to the pressure 80 in the line system.

The switchable and controllable devices, valves, sensors, actuators, drives et cetera of the compressed-air system are, where possible and necessary, connected in a known manner via corresponding electrical lines or by wireless communication to the control unit 30. For the sake of better clarity, this is indicated here merely by a dash-dotted line, which encloses the corresponding devices but is not to be regarded as exhaustive.

In the pneumatic circuit diagram, it is also possible to see a compressed-air accumulator 9, in which a pressure 90 prevails. The compressed-air accumulator 9 is connected via an accumulator valve 10, and a boost valve 11 connected in parallel with respect to the accumulator valve, to a line system that includes the pressure feed line 12 (pressure line) and the flow transfer line 13. The flow transfer line 13 is used both in the boost mode and in the reflow mode, and is then correspondingly referred to as boost line or as reflow line, wherein its throughflow direction remains the same.

The bellows valves 1a to 4a, the separation valve 6, the reflow valve 7, the accumulator valve 10, the boost valve 11 and the outlet valve 22 are solenoid valves that are actuated by the control device 30 and the algorithm programmed therein. This list is not exhaustive, and further valves and apparatuses may also be actuated by the control device 30.

A two-stage compressor 15 that is driven by an electric motor 14 is illustrated on the left-hand side of the circuit diagram. The control unit 30 also controls the electric motor and thus the compressor 15. In the line system, it is also possible to see an air dryer 16, a filter 17, and further valves and throttles, namely the check valves 18, 19, the throttles 20, 21, the outlet valve 22 and the pilot-controlled valve 23, which is connected to a control pressure line 24. The line system is connected to the surroundings via the outlet and inlet 25.

The pressure feed line 12, flow transfer line 13, compressor 15, air dryer 16, check valves 18, 19, throttles 20, 21 and the switchable solenoid valve 22 and the pilot-controlled valve 23 can be regarded here as belonging to that part of the pneumatic line system which is referred to as the accumulator-related gallery, and which substantially contains the compressed-air supply devices. The definition of the term "accumulator-related gallery" is by no means unequivocal in the technical field, and in different compressed-air systems may encompass different devices and valves, as already mentioned above.

FIG. 2 now shows, by way of example, which line and system parts in such a vehicle air suspension system are involved in carrying out the method according to the disclosure for avoiding tank hammer in the boost mode, and which steps are necessary for this purpose. In the case of air spring bellows being filled via compressor-assisted residual pressure recovery from the compressed-air accumulator, it is intended in the case illustrated here that the two air spring bellows 3 and 4, which belong to one axle 202, are filled quickly, and the axle 202 thus raised. The flow in the boost mode from the pressure accumulator 9 into the air spring bellows 3 and 4 is illustrated by the arrows in FIG. 2, and the flow-carrying lines/line parts involved in the boost mode are plotted with a greater thickness in FIG. 2 for elucidation.

Via the control device 30 using the algorithm, the electric motor 14 is firstly activated, and the compressor 15 is thus driven, which introduces air into the line system and increases the pressure therein. The separation valve 6 and the reflow valve 7 are opened, and the pressure 80 in the line system 5 is measured via the pressure sensor 8. Here, the accumulator valve 10 and the boost valve 11 remain closed until pressure equalization has been established in the boost line, that is, until the pressure in the line system is equal or close to the accumulator pressure/pressure in the compressed-air accumulator. The pressure 90 in the compressed-air accumulator 9 (accumulator pressure) is either a fixed pressure 90', possibly known from the most recent measurement, or for example a pressure 90" specified by the algorithm as an average value.

The boost mode is then started after the pressure equalization has been achieved. Here, the "boost valve" 11 provided for the connection to the accumulator, and the bellows valves 3a and 4a, are opened, with the reflow valve 7 being closed beforehand or at the latest at the same time. Owing to the preceding pressure equalization, no tank hammer occurs when the boost valve 11 is opened, and the air spring bellows 3 and 4 can be filled from the compressed-air accumulator 9 with assistance from the compressor, as illustrated in principle by the arrows in FIG. 2.

By contrast, FIG. 3 shows which line and system parts are involved in carrying out the method according to the disclosure in the reflow mode, and which steps are necessary. In the case of the compressed-air accumulator being filled via compressor-assisted residual pressure recovery from the air spring bellows, it is intended in this case that the two air spring bellows 3 and 4, which belong to one axle 202, are vented into the accumulator, and the axle 202 thus lowered. The flow of the medium air from the air spring bellows 3 and 4 into the pressure accumulator 9 in the reflow mode is illustrated by the arrows in FIG. 3, and the flow-carrying lines/line parts involved in the reflow mode are likewise plotted with a greater thickness in FIG. 3 for elucidation.

The pressure equalization prior to the initiation of the reflow mode is carried out in this case not via the compressor but via the pressure 50 prevailing in the bellows, which is possible with very little noise. For this purpose, in the reflow mode illustrated in FIG. 3, the bellows valves 3a and 4a and the separation valve 6 are opened until pressure equalization is established in the bellows-related gallery 5, with the pressure 80 in the line system being measured via the pressure sensor 8. Then, the separation valve 6 is closed and the reflow valve 7 and the accumulator valve 10 are opened, and the reflow mode is thus started.

Owing to the preceding pressure equalization, no tank hammer occurs when the accumulator valve 10 is opened, and the compressed-air accumulator 9 can then be filled from the air spring bellows 3 and 4 with assistance from the compressor, as illustrated in principle by the arrows in FIG. 3.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART
OF THE DESCRIPTION)

1-4 Air spring bellows
1a-4a Bellows valve, solenoid valve
5 Bellows-related gallery (part of the line system)
6 Separation valve, solenoid valve
7 Reflow valve, solenoid valve
8 Pressure sensor
9 Compressed-air accumulator
10 Accumulator valve, solenoid valve
11 Boost valve, solenoid valve
12 Pressure feed line (pressure line)
13 Flow transfer line (boost line/reflow line)
14 Electric motor/compressor drive
15 Two-stage compressor 16 Air dryer
17 Filter
18, 19 Check valve
20, 21 Throttle
22 Outlet valve, solenoid valve
23 Pilot-controlled valve
24 Control pressure line
25 Outlet/inlet
30 Control device
41-44 Pneumatically operated actuator
50 Bellows pressure, pressure in the air spring bellows
80, 80', 80" Pressure in the line system
90, 90', 90" Pressure in the compressed-air accumulator
100 Compressed-air system
200, 200' Vehicle
201 Wheel
202 Axle
300 Vehicle air suspension system
400 Vehicle controller
$\Delta P(_1)$ Difference between the pressure in the compressed-air accumulator and the pressure in the line system before a pressure equalization
$\Delta P(_2)$ Difference between the pressure in the compressed-air accumulator and the pressure in the line system after a pressure equalization

The invention claimed is:

1. A method for operating a compressed-air system in a vehicle, wherein the compressed-air system has a plurality of pneumatically operated actuators, a plurality of switchable pneumatic valves, a plurality of compressed-air supply devices and a plurality of compressed-air treatment devices, which are interconnected via a pneumatic line system, wherein the plurality of compressed-air supply devices include at least one compressed-air source and a compressed-air accumulator, and a pressure sensor is provided in the pneumatic line system for measuring a pressure in the pneumatic line system, wherein at least one electronic control device is provided for open-loop and closed-loop control of the compressed-air system, and the plurality of switchable pneumatic valves, the plurality of compressed-air supply devices and the plurality of compressed-air treatment devices are actuated in accordance with an algorithm, which is programmed in the control device, and a switching program specified in the algorithm, the method comprising:

actuating, via the algorithm for the switching program, a subset of the plurality of switchable pneumatic valves in order to connect the compressed-air accumulator to the pneumatic line system only after a pressure equalization between pressure in the compressed-air accumulator and pressure in the pneumatic line system, wherein the algorithm for the switching program is programmed such that the plurality of switchable pneumatic valves are actuated in dependence upon a difference between a first pressure in the compressed-air accumulator and a second pressure in the pneumatic line system, wherein the pressure equalization is initiated by the control device by actuation of the plurality of switchable pneumatic valves; and, wherein, for the pressure equalization, compressed air is introduced from at least one of the compressed-air source and the plurality of pneumatically operated actuators into the pneumatic line system.

2. The method of claim 1, wherein a plurality of air spring bellows assigned to respective wheels or axles of the vehicle are provided as actuators and are each connectable via a switchable bellows valve to the pneumatic line system; and, the plurality of compressed-air supply devices and the plurality of compressed-air treatment devices include at least one electrically driven compressor, the compressed-air accumulator connectable via at least one switchable accumulator valve to the pneumatic line system, an air dryer, and an air filter, and the pressure equalization is carried out by virtue of compressed air being introduced from at least one of the at least one electrically driven compressor and the plurality of air spring bellows into the pneumatic line system.

3. The method of claim 2, wherein, before the compressed-air accumulator is filled via the at least one electrically driven compressor, the pressure equalization is carried out in that the at least one compressor is activated, the pressure in the pneumatic line system is then measured, and the compressed-air accumulator is connected via the at least one switchable accumulator valve to the pneumatic line system only if the pressure in the pneumatic line system has been equalized with the pressure in the compressed-air accumulator as a result of operation of the at least one compressor.

4. The method of claim 3, wherein the pressure equalization is carried out such that the pressure in the pneumatic line system differs by at most +/−10% from the pressure in the compressed-air accumulator.

5. The method of claim 2, wherein, before the pressure in the compressed-air accumulator is measured via the pressure sensor, the pressure equalization is carried out within the pneumatic line system by virtue of compressed air being introduced from at least one air spring bellows into the pneumatic line system, wherein at least one of the plurality of air spring bellows is firstly connected via the respective bellows valve to the pneumatic line system, and after the pressure in the pneumatic line system has been approximated to the pressure in the compressed-air accumulator, each bellows valve is closed and the at least one accumulator valve is opened.

6. The method of claim 2, wherein, before the plurality of air spring bellows are filled from the compressed-air accumulator, the pressure equalization is carried out in that, if there is a pressure difference $\Delta P(_1)$ between the pressure in the compressed-air accumulator and the pressure in the pneumatic line system, compressed air is firstly conducted from at least one of the plurality of air spring bellows into the pneumatic line system, and the compressed-air accumulator is connected via the at least one accumulator valve to the pneumatic line system only if the pressure difference $\Delta P(_1)$ has been equalized or reduced to a value of $\Delta P(_2) < \Delta P(_1)$.

7. The method of claim 2, wherein, before the air dryer is regenerated by virtue of compressed air being blown out via a blow-off valve, the pressure equalization is carried out in that, if there is a pressure difference between the pressure in the compressed-air accumulator and the pressure in the pneumatic line system, compressed air is firstly conducted from either at least one of the plurality of air spring bellows and/or via the at least one compressor into the pneumatic line system, and the compressed-air accumulator is connected via a second subset of switchable valves to the pneumatic line system, and via the pneumatic line system to the blow-off valve, only if the pressure equalization has been established between the pressure in the compressed-air accumulator and the pressure in the pneumatic line system.

8. The method of claim 2, wherein, if the pressure equalization by introduction of compressed air from an air spring bellows is repeated, compressed air is conducted into the pneumatic line system from at least one air spring bellows other than that used for a preceding pressure equalization.

9. The method of claim 2, wherein, if compressed air is introduced from the plurality of air spring bellows into the pneumatic line system, compressed air is introduced firstly from that air spring bellows which has the lowest bellows pressure, and compressed air is subsequently introduced sequentially from those air spring bellows which have the next higher bellows pressure in each case.

10. The method of claim 2, wherein, instead of or in addition to compressed air from one of the plurality of air spring bellows, compressed air is introduced into the pneumatic line system via the at least one compressor.

11. The method of claim 2, wherein, before the plurality of air spring bellows are filled from the compressed-air accumulator with assistance by operation of the at least one compressor, the pressure equalization is carried out in that, if there is a pressure difference $\Delta P_{(1)}$ between the pressure in the compressed-air accumulator and the pressure in the pneumatic line system, compressed air is firstly introduced from at least one of the plurality of air spring bellows and/or via the at least one compressor into the pneumatic line system, and the plurality of air spring bellows and the compressed-air accumulator are connected to the pneumatic line system, and compressed air conveyed from the compressed-air accumulator via the pneumatic line system into the plurality of air spring bellows with assistance by operation of the at least one compressor, only if the pressure difference $\Delta P_{(1)}$ has been equalized or reduced to a value of $\Delta P_{(2)} < \Delta P_{(1)}$.

12. The method of claim 11, wherein, after the pressure equalization, a connection is established between the plurality of air spring bellows and the compressed-air accumulator by virtue of a separate boost valve, which connects the compressed-air accumulator to a line part, and the bellows valves are opened.

13. The method of claim 2, wherein, before the compressed-air accumulator is filled from the plurality of air spring bellows with assistance by operation of the at least one compressor, a pressure equalization is carried out in that, if there is a pressure difference $\Delta P_{(1)}$ between the pressure in the compressed-air accumulator and the pressure in the pneumatic line system, compressed air is firstly introduced from at least one of the air spring bellows and/or via the at least one compressor into the pneumatic line system, and the plurality of air spring bellows and the compressed-air accumulator are connected to the pneumatic line system, and compressed air conveyed from the plurality of air spring bellows via the pneumatic line system into the compressed-air accumulator with assistance by operation of the at least one compressor, only if the pressure difference $\Delta P_{(1)}$ has been equalized or reduced to a value of $\Delta P_{(2)} < \Delta P_{(1)}$.

14. The method of claim 13, wherein, the pneumatic line system includes a first bellows-related line system and wherein after the pressure equalization, a connection is established between the plurality of air spring bellows and the compressed-air accumulator by virtue of the switchable accumulator valve and a separate reflow valve, which connects the compressed-air accumulator to the first bellows-related line system, and the bellows valves are opened.

15. The method of claim 2, wherein a following value is taken as a basis as a pressure in the pneumatic line system:
   either a pressure in the pneumatic line system measured in a first bellows-related line system and/or in a second accumulator-related line system; or
   a stored old value of the pressure in the pneumatic line system; or
   a fixed value for the pressure in the pneumatic line system.

16. The method of claim 15, wherein the fixed value for the pressure in the pneumatic line system is ≤2 bar.

17. The method of claim 2, wherein, in a case of the pressure equalization between the pressure in the compressed-air accumulator and the pressure in the pneumatic line system carried out by operation of the at least one compressor, the pressure in the pneumatic line system that is achievable by operation of the at least one compressor is determined on a basis of tables, stored in the algorithm, for a correlation between running times of the at least one compressor and the pressure in the pneumatic line system.

18. The method of claim 2, wherein the pressure in the compressed-air accumulator is specified by the algorithm as a fixed value.

19. The method of claim 2, wherein the pressure in the compressed-air accumulator is specified by the algorithm as an average value.

20. The method of claim 2, wherein, in a case of the pressure equalization between the pressure in the compressed-air accumulator and the pressure in the pneumatic line system carried out by operation of the at least one compressor, the pressure in the pneumatic line system that is achievable by operation of the at least one compressor is attainable on a basis of running times of the at least one compressor stored in the algorithm, and the compressed-air accumulator is connected via the plurality of switchable pneumatic valves to the pneumatic line system only if the running times of the at least one compressor have been reached.

21. An algorithm, which is programmed in a control device of a vehicle controller, for carrying out a switching program in accordance with the method of claim 2.

22. A vehicle air suspension system comprising:
   a control device including a processor and having a program code for carrying out a switching program stored therein;
   a compressed-air system having a plurality of pneumatically operated actuators, a plurality of switchable pneumatic valves, a plurality of compressed-air supply devices and a plurality of compressed-air treatment devices, which are interconnected via a pneumatic line system,
   an air spring bellows and a switchable bellows valve interconnected in a first bellows-related line system;
   said plurality of compressed-air supply devices and said plurality of compressed-air treatment devices being provided in a second accumulator-related line system;
   said first bellows-related line system and said second accumulator-related line system being interconnectable via at least one of the plurality of switchable pneumatic valves configured as a separation valve;
   a pressure sensor being arranged in said first bellows-related line system for measuring a pressure in said first bellows-related line system;
   said plurality of compressed-air supply devices including at least one compressed-air source and a compressed-air accumulator;
   said control device being configured for open-loop and closed-loop control of said compressed-air system, and said plurality of switchable pneumatic valves, said plurality of compressed-air supply devices and said plurality of compressed-air treatment devices being actuated in accordance with said algorithm;
   said program code being configured, when executed by said processor, to actuate, via said algorithm for said switching program, a subset of the plurality of switchable pneumatic valves in order to connect said compressed-air accumulator to said pneumatic line system only after a pressure equalization between the pressure in said compressed-air accumulator and the pressure in said pneumatic line system, wherein said algorithm for said switching program is programmed such that said plurality of switchable pneumatic valves are actuated in dependence upon a difference between a first pressure in said compressed-air accumulator and a second pressure in said pneumatic line system, wherein the pressure equalization is initiated by said control device by actuation of the plurality of switchable pneumatic valves; and, wherein, for the pressure equalization, compressed air is introduced from at least one of said at least one compressed-air source and said plurality of pneumatically operated actuators into said pneumatic line system.

23. The vehicle air suspension system of claim 22, wherein, for the connection between said first bellows-related line system and said second accumulator-related line system, a further valve is provided which is connected in parallel with respect to said separation valve, and, for the connection of said accumulator to said second accumulator-related line system, a further valve is provided which is connected in parallel with respect to an accumulator valve.

24. A vehicle comprising the vehicle air suspension system of claim 22.

25. The vehicle of claim 24, wherein the vehicle is a utility vehicle.

* * * * *